Feb. 9, 1971  D. M. GIBSON ET AL  3,561,825

TRACK AND DRIVE SPROCKET FOR TRACK-LAYING

Filed Dec. 13, 1968

Duane M. Gibson
Richard H. A. Schoonover
INVENTORS

BY

Oliver D. Olson
Agent

United States Patent Office 3,561,825
Patented Feb. 9, 1971

3,561,825
TRACK AND DRIVE SPROCKET FOR TRACK-LAYING
Duane M. Gibson, Milwaukie, and Richard H. A. Schoonover, West Linn, Oreg., assignors to Katrak Vehicle Co., Canby, Oreg., a corporation of Oregon
Filed Dec. 13, 1968, Ser. No. 783,567
Int. Cl. B62d 55/12
U.S. Cl. 305—20                                6 Claims

ABSTRACT OF THE DISCLOSURE

An endless track has longitudinally spaced ground-engaging grousers engageable by a drive sprocket having tooth elements pivoted thereon to seat positively against the confronting surfaces of the grousers during driving of the track.

BACKGROUND OF THE INVENTION

This invention relates to track-laying vehicles, and more particularly to a novel track and drive sprocket construction therefor.

Track-laying vehicles generally provide drive sprocket connection to the inner periphery of the track either by chain assemblies integrated with the track or by end sprocket wheels engaging drive lugs provided on the inner periphery of the track. These arrangements involve complex and costly constructions, are susceptible to excessive wear, jamming and breakage by collected debris, and are difficult to repair.

SUMMARY OF THE INVENTION

In its basic concept the present invention utilizes the ground-engaging grousers of a track as the track drive connection to an external sprocket having pivoted teeth affording positive engagement with grousers with minimum friction during driving of the track.

It is by vertue of the foregoing basic concept that the principal objective of the present invention is achieved, namely to overcome the disadvantages of prior track and drive sprocket assemblies, as enumerated hereinbefore.

Another important objective of this invention is the provision of a track drive sprocket capable of efficient use with tracks having grousers of various shapes.

A further important object of the present invention is the provision of a grouser for track-laying vehicles, which grouser effords maximum ground traction with minimum surface disturbance.

The foregoing and other objects and advantages of the present invention will appear from the following detailed description taken in connection with the accompanying drawing of a preferred embodiment.

DESCRIPTION OF THE PREFERRED EMBODIMENTS

Figure 1:
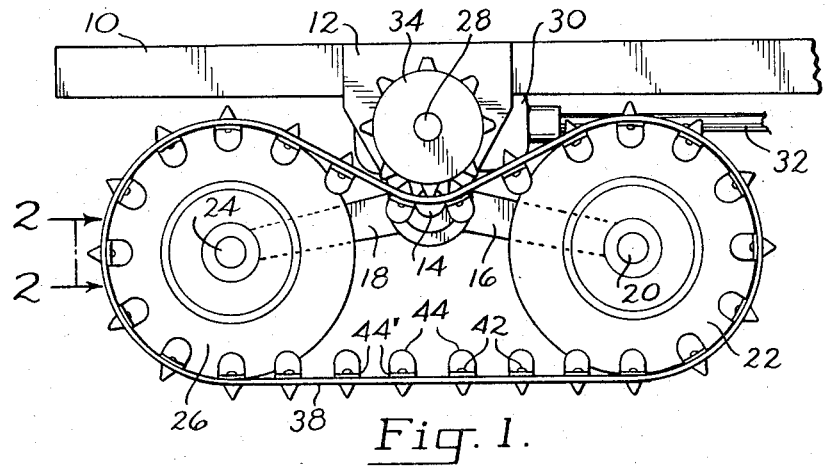
FIG. 1 is a fragmentary side elevation of a track-laying vehicle incorporating a track and drive sprocket assembly embodying the features of the present invention.

In FIG. 1 there is illustrated a vehicle frame 10 the laterally spaced longitudinal side members of which each supports intermediate its ends a downwardly projecting bracket 12. Aligned openings in these brackets receive the transverse shaft 14 which is journaled in suitable bearings (not shown). The shaft pivotally supports a pair of laterally spaced wheel mounting members each of which comprises a pair of arms 16 and 18 mounted pivotally at their inner ends on the shaft 14. One of the arms 16 extends in the forward direction of the vehicle frame, and a transverse stub shaft 20 on the forward end of the arm rotatably mounts the front wheel and pneumatic tire assembly 22. The other arm 18 extends in the rearward direction of the vehicle frame and the transverse stub shaft 24 at the rearward end of the arm rotatably mounts the rear wheel and tire assembly 26.

Aligned openings in the brackets above the shaft receive therethrough the opposite end portions of the drive shaft 28 associated with differential mechanism in the differential housing 30. The differential gear mechanism is driven by the main drive shaft 32 extending from a transmission associated with the vehicle engine, in conventional manner.

Each of the laterally projecting ends of the drive shaft 28 supports a track drive sprocket 34, the construction of which is described in detail hereinafter. The sprocket is arranged in driving engagement with an endless track assembly trained about the wheels.

Figure 2:
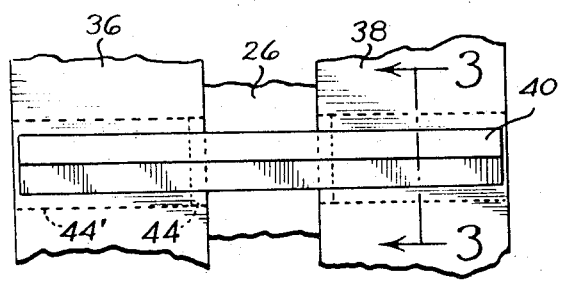
FIG. 2 is a fragmentary end elevation, as viewed from the left in FIG. 1 in the direction of the arrows. 2—2.
Figure 3:
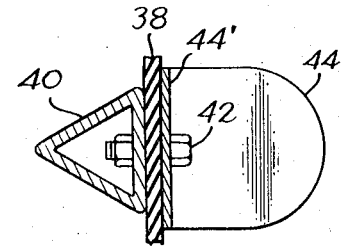
FIG. 3 is a fragmentary sectional view taken on the line 3—3 in FIG. 2.

Referring particularly to FIGS. 2 and 3 of the drawing, the track assembly comprises a pair of laterally spaced endless belts 36 and 38 secured together by a plurality of longitudinally spaced ground-engaging grousers 40. In the embodiment illustrated, each grouser comprises an elongated hollow member of triangular cross section and is of sufficient length of span the belts and the space therebetween. The base of the triangular grouser abuts the outer surfaces of the belts, with the apex projecting outwardly therefrom. A plurality of bolts 42 releasably secure the belts and grouser together.

The track mounting wheels support the track in the area between the belts, bearing against the intermediate portions of the grousers 40 which span the space between the belts. To insure proper alignment of the track on the wheels, a plurality of longitudinally spaced guide members 44 are secured, by their flange portions 44', to the inner sides of the belts, conveniently by the same bolts which secure the grousers. The guide members extend inwardly adjacent the inner edges of the belts, to confine the mounting wheels between them.

Figure 5:
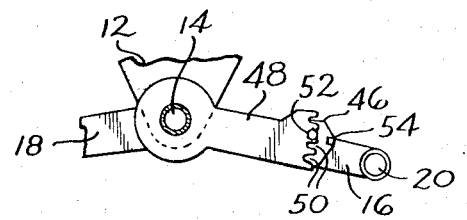
FIG. 5 is a fragmentary side elevation showing structural details of means for securing the support arms of track mounting wheels releasably in positions of angular adjustment.

Means is provided for adjusting the angular relationship between the pair of arms 16 and 18 to insure proper driving contact between the track and sprocket 34 and also to facilitate removal and installation of the track on the mounting wheels. Thus, with reference to FIG. 5, there is secured to each of the front arms 16 a forwardly extending plate 46 and to each of the rear arms 18 a forwardly extending plate 48. The forward end of the plate 48 is provided with a plurality of notches 50 arranged in an arcuate path with reference to the axis of the shaft 14. An opening in the other plate registers with the notches and receives a locking bolt 52 by which the plates may be secured together in various positions of angular adjustment. A lug 54 projecting inward from the front end of the plate 46 provides a fulcrum for a tool, such as a pry bar, adapted to engage one of the notches to facilitate the adjustment.

Thus, mounting of the track on the wheels is facilitated by releasing the locking bolt 52 and allowing the arms 16 and 18 to pivot downward temporarily to shorten the distance between the wheels. After the track is mounted on the wheels, the arms are pivoted upward until the upper stretch of track between the wheels are brought into firm engagement with the sprocket 34.

Figure 4:
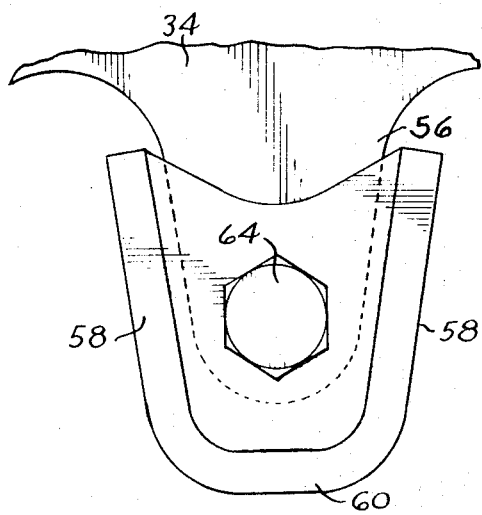
FIG. 4 is a fragmentary vertical elevation showing structural details of a track drive sprocket embodying the features of this invention.

Referring now particularly to FIG. 4 of the drawing, the drive sprocket includes a plurality of circumferentially spaced, outwardly projecting fixed stub teeth 56, each adapted to mount a pivoted tooth. In the embodiment illustrated the pivoted tooth comprises a reversely bent plate providing spaced walls 58 and an interconnecting closed end 60. Since the pivoted tooth illustrated is designed for use with the triangular grouser, the side walls diverge slightly from the closed end. Interconnecting the side walls are a pair of laterally spaced reinforcing webs 62. The spacing between the webs is slightly greater than the thickness of the stub tooth 56, whereby to receive the latter freely between them. Aligned openings in the webs and stub tooth receive the pivot bolt 64 by which the pivoted tooth is secured releasably to the sprocket stub tooth for limited pivotal movement on an axis substantially parallel to the rotational axis of the sprocket. The degree of pivotal movement of the tooth is limited by abutment of the inner surfaces of the side walls 58 against the adjacent edges of the stub tooth 56.

It will be apparent that the drive sprocket described hereinbefore may be utilized with tracks in which the grousers have cross sectional shapes other than the triangular shape illustrated. In such event, the slightly diverging U-shaped profile of the pivoted tooth illustrated in FIG. 4 will be modified to correspond to the cross sectional shape of the grouser.

The action of the pivoted sprocket tooth and grouser illustrated is as follows:

As the drive sprocket rotates, bringing one of the pivoted teeth into engagement with a grouser 40, the pivoted tooth is caused to pivot on the axis of the bolt 64 to bring the outer surface of the side wall 58 of the tooth leading in the direction of rotation of the sprocket into positive flush engagement with the confronting, trailing face of the grouser 40. As the sprocket continues rotation and the track moves in response thereto, the pivoted tooth continues to pivot, whereby to maintain said flush contact with the grouser. Accordingly, maximum driving engagement is maintained. Moreover, since the abutting surfaces of the pivoted tooth and grouser do not move relative to each other, frictional wear of the tooth and grouser is substantially eliminated.

Although the grouser may be provided in other cross sectional shapes, the triangular shape illustrated is preferred since it provides a wedging action on the surface of the ground to provide maximum traction. Moreover, the triangular grouser enters and leaves the surface of the ground with a minimum of disturbance or agitation of the ground surface.

From the foregoing it will be appreciated that the present invention provides for track-laying vehicles a track and drive sprocket construction which affords maximum driving connection between the sprocket and track, with minimum wear, and also provides maximum traction on the ground with minimum disturbance of the ground surface.

Having now described our invention and the manner in which it may be used, we claim:

1. In a track-laying vehicle having a pair of longitudinally spaced track mounting wheels, a track and drive sprocket assembly comprising
    (a) endless belt means trained about said wheels,
    (b) a plurality of longitudinally spaced ground-engaging grouser members extending transversely of the belt means and secured to the outer side thereof,
    (c) a drive sprocket member mounted on the vehicle between said mounting wheels and above the upper stretch of said belt means for rotation on an axis substantially parallel to the axes of said wheels, and
    (d) a plurality of circumferentially spaced tooth members each mounted on the sprocket member for limited pivotal movement on an axis spaced radially from and substantially parallel to the rotational axis of the sprocket member,
    (e) the tooth members being disposed for engagement with the side surfaces of the grouser members.

2. The assembly of claim 1 wherein the sprocket member includes a plurality of circumferentially spaced fixed stub teeth for pivotally mounting the tooth members, and each tooth member comprises a substantially U-shape body defined by side walls and a connecting outer end wall, and web means secured to and extending between said side walls, the web means being secured pivotally to the stub tooth on the sprocket member.

3. The assembly of claim 1 wherein the endless belt means comprises a pair of laterally spaced endless belts, the grouser members being secured to said belts and spanning the space between them for engagement by the wheels.

4. The assembly of claim 3 including a plurality of longitudinally spaced guide members secured to the inner sides of the belts and extending inwardly thereof adjacent the spaced inner edges of the belts for confining said wheels therebetween.

5. The assembly of claim 1 wherein each grouser member is of triangular cross section, the base thereof being secured to the belt means and the apex thereof projecting outward therefrom.

6. The assembly of claim 5 wherein each tooth member is of substantially U-shape in profile, the spaced ends thereof diverging from the closed end.

References Cited
UNITED STATES PATENTS

| | | | |
|---|---|---|---|
| 568,837 | 10/1896 | Cowen | 74—243 |
| 2,365,544 | 12/1944 | Geyer | 74—243 |
| 2,661,251 | 12/1953 | Bonmartini | 305—34 |
| 3,367,726 | 2/1968 | Tucker | 305—35X |
| 3,390,924 | 7/1968 | Bumbaugh | 305—35 |
| 3,443,844 | 5/1969 | Schoonover | 180—9.62X |

RICHARD J. JOHNSON, Primary Examiner

U.S. Cl. X.R.

74—243; 305—35, 57